United States Patent [19]

Saur

[11] 4,353,458
[45] Oct. 12, 1982

[54] BELT SUPPORTS FOR ACCUMULATORS

[75] Inventor: Charles W. Saur, Sparta, Mich.

[73] Assignee: Lear Siegler, Inc., Grand Rapids, Mich.

[21] Appl. No.: 148,546

[22] Filed: May 9, 1980

[51] Int. Cl.³ .............................................. B65G 13/06
[52] U.S. Cl. .................................. 198/781; 198/790; 198/809; 198/840
[58] Field of Search ............... 198/781, 789, 790, 806, 198/809, 810, 835, 840, 842, 785

[56] References Cited

U.S. PATENT DOCUMENTS

| | | | |
|---|---|---|---|
| 2,593,157 | 4/1952 | Lorig | 198/785 |
| 2,688,216 | 9/1954 | Lorig et al. | 198/842 |
| 3,967,718 | 7/1976 | Monahan | 198/790 |
| 4,223,780 | 9/1980 | Saur | 198/789 |
| 4,269,305 | 5/1981 | Fryatt | 198/781 |

FOREIGN PATENT DOCUMENTS 723717 6/1942 Fed. Rep. of Germany ...... 198/806
2528569 3/1976 Fed. Rep. of Germany ...... 198/781

Primary Examiner—Joseph E. Valenza
Attorney, Agent, or Firm—Price, Heneveld, Huizenga & Cooper

[57] ABSTRACT

A support for a flat conveyor belt is disclosed which utilizes a pair of tapered rollers, one on each side of the belt's centerline. The rollers are mounted on shafts which are inclined to the plane of the belt such that the roller surfaces are parallel to the surface of the belt. The roller supporting shafts are also at an angle of less than 90° to the centerline of the belt such that they converge either upstream or downstream of the belt with respect to the belt's direction of travel. The rollers are also free for a limited degree of travel in response to the bias given to them by the movement of the belt. The angular relationship of the shafts to the belt centerline can be varied resulting in lateral movement of the rollers. This results in vertical movement of the belt and thus a conveyor with the capacity to serve as an accumulator.

17 Claims, 10 Drawing Figures

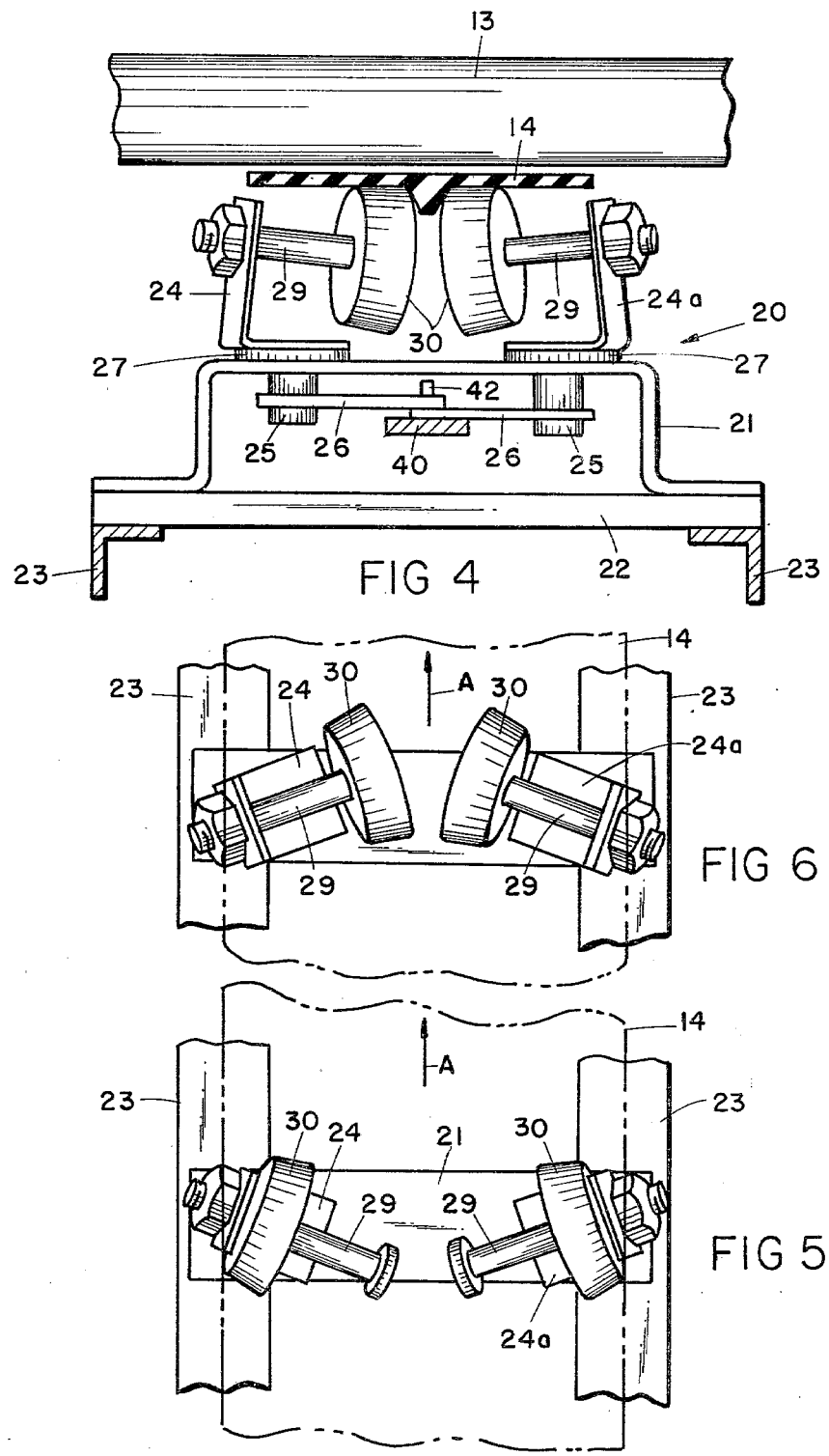

BELT SUPPORTS FOR ACCUMULATORS

BACKGROUND OF THE INVENTION

In the field of power operated conveyors, the movement imparted to the articles being conveyed is normally transmitted directly or indirectly to the article by means of a belt or cable. In the case of belt operated conveyors, various types of belts are used including the narrow, so-called V-belt, as well as the more conventional flat belt which provides a wide driving contact surface. In modern conveyors employing a flat belt, the width of the belt is normally only a minor portion of the over all width of the conveyor. Particularly is this true with respect to conveyors having accumulation capability. This invention is concerned with the means for supporting the flat type of belt in a conveyor. It is related to and employs principles disclosed in copending patent application, Ser. No. 938,866, entitled "Accumulation Conveyors" filed Sept. 1, 1978 and having a common assignee now U.S. Pat. No. 4,223,780, issued Sept. 23, 1980.

The invention provides improved support for flat belts to reduce wear and the noise level incident to operation. This invention differs from the one in the noted pending application in that it provides a support which permits accumulation with a flat belt as opposed to the structure disclosed in the pending application which is specifically designed for use with the cable type of conveyor.

BRIEF DESCRIPTION OF THE INVENTION

The invention provides a plurality of supports for a flat conveyor belt. Each support consists of a pair of tapered or conical rollers each making contact with and supporting the flat belt from underneath. The rollers are mounted in pairs equally spaced on opposite sides of the centerline of the belt. The rollers of each pair are mounted for free rotation on separate axles which are inclined to the plane of the belt whereby the tapered surface of the rollers is parallel with the bottom surface of the belt. Thus, the top surface of the roller makes a flat or horizontal contact with the under surface of the belt. The axles for the rollers are mounted on brackets which can be pivoted about vertical axes such that they can be shifted from a position in which they converge upstream of the direction of movement of the belt to a position where they converge downstream with a result that the conical rollers, under the influence of the driven belt, will travel either toward the inner ends or the outer ends of the supporting axles. Since the axles are inclined with respect to the plane of the belt, the movement of the rollers lengthwise of the axles, i.e. transversely of the belt, will either raise or lower the belt depending upon the axial position of the rollers along their supporting axles. The pivotal position of the roller supporting axles can be controlled by suitable article sensing members mounted at intervals along the conveyor.

BRIEF DESCRIPTION OF THE DRAWINGS

FIG. 4 is a view similar to FIG. 3 illustrating the invention shifted to accumulator mode;

FIG. 5 is a plan view of the structure illustrated in FIG. 3 with the belt illustrated in phantom for clarity;

FIG. 6 is a fragmentary plan view of the structure illustrated in FIG. 4 with the belt shown in phantom for clarity;

DESCRIPTION OF THE PREFERRED EMBODIMENT

Figure 1:
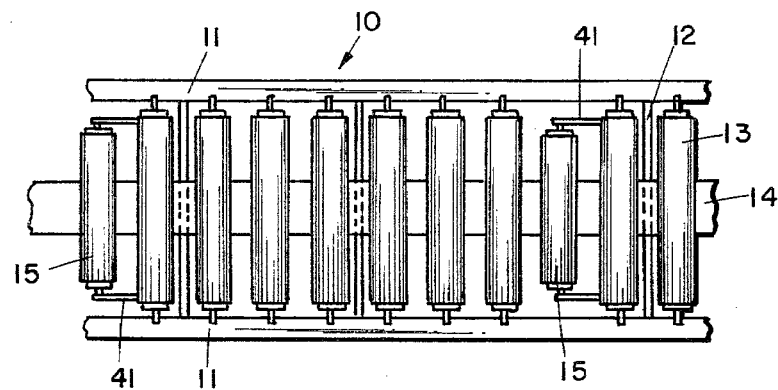
FIG. 1 is a fragmentary, plan view of a typical conveyor to which this invention is applied.
Figure 2:
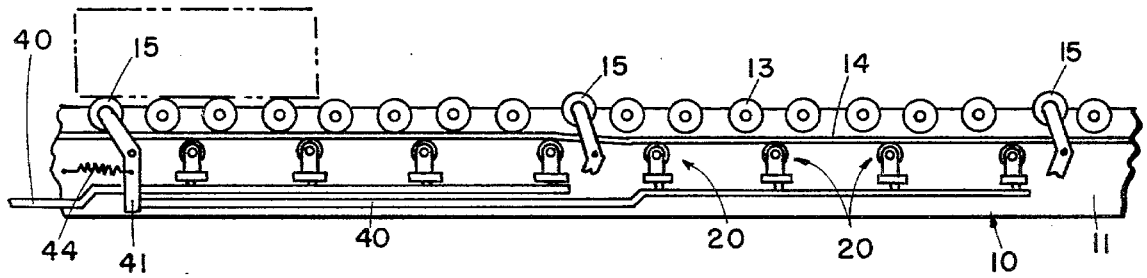
FIG. 2 is a sectional, elevational view, partially schematic, of a conveyor to which this invention has been applied.

Referring to FIG. 1, the numeral 10 indicates a conveyor of conventional design having side frame members 11 interconnected by suitable cross pieces 12 and supporting a plurality of rollers 13 which, collectively, form an article supporting and conveying surface. The rollers are driven from beneath by a belt 14. At spaced intervals along the conveyor, sensing rollers 15 are provided which, as appears in FIG. 2, are biased into a position raised slightly above the conveying surface defined by the rollers 13 so they will be depressed by articles passing over them. All of this structure is conventional.

Figure 3:
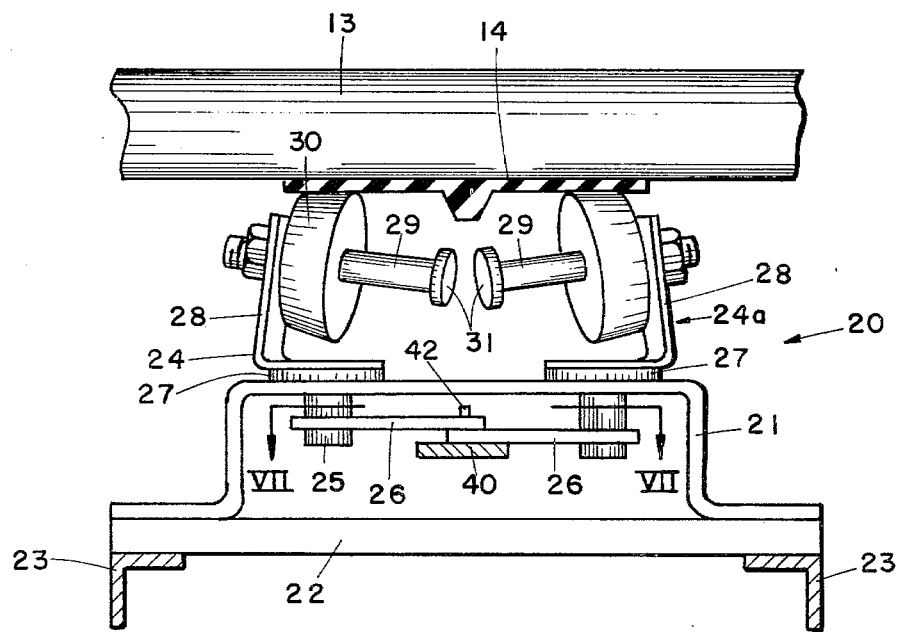
FIG. 3 is an enlarged, fragmentary, sectional, elevational view of an accumulator conveyor in conveying mode to which this invention has been applied taken along a plane transverse of the conveyor.
Figure 7:
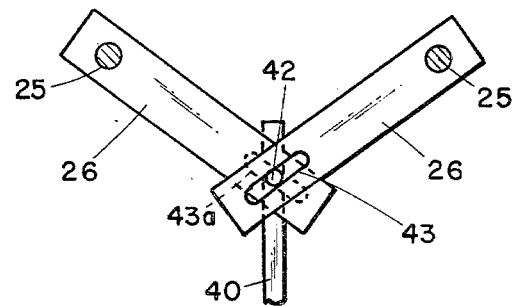
FIG. 7 is a sectional view taken along the plane VII—VII of FIG. 3.

At spaced intervals, the belt is supported from beneath by standards 20. As illustrated in FIGS. 3-6, each standard 20 has a hat-shaped base member 21 mounted on a suitable support 22. The support rests on suitable stringers 23 as illustrated in FIG. 3. The stringers can be supported on the cross pieces 12. Pivotally mounted to each base member 21 are a pair of brackets 24 and 24a. Each bracket has a vertical pin 25 which extends through a suitable opening in the base member 21 and, at its lower end, is rigidly secured to an actuating lever 26 (FIGS. 3, 4 and 7). To facilitate rotation of the brackets 24 and 24a, a washer-like bearing or spacer 27 is positioned between the bottom surface of the bracket and the top surface of the base member 21.

Each of the brackets 24 and 24a at its outward end has an upstanding leg. The upstanding legs are inclined upwardly and inwardly at a small angle. A stud shaft 29 is mounted to each of the brackets adjacent the upper end of the upstanding leg. The stud shafts are normal to the face of the legs 28 of the brackets and, thus, extend inwardly and downwardly with respect to a horizontal plane.

Mounted on each of the stud shafts is a conical roller 30. In the construction illustrated, the end with the least diameter of each of the rollers faces outwardly and the end of each of the rollers of larger diameter faces inwardly. The stud shafts 29 are longer than the axial length of the rollers 30. Thus each of the rollers has a limited distance of axial travel along the shafts which travel is limited in an outward direction by the legs 28 and in the inward direction by a suitable stop or head 31 on the inner end of the shafts 29.

The angle of inclination of the legs 28 of the brackets is equal to the angle of inclination of the conical sides of the rollers 30 with respect to the central axis of the rollers. Since the stud shafts 29 are normal to the inner faces of the legs 28, the top surfaces of the rollers are in a common, horizontal plane and, thus, provide a flat, horizontal support surface for the belt 14. It will be noted from FIG. 3 that the brackets 24 and 24a are centered about the centerline of the belt and, thus, the rollers 30 are equally spaced from the belt centerline. It will be noted from FIGS. 3 and 5 that not only are the shafts 29 inclined downwardly toward the centerline of the belt, they are also convergent opposite to the direction of movement of the belt as indicated by arrow A in FIG. 5. In this position, the rollers are at the outer limit of their travel toward the bracket legs 28. As such, they are positioned at the highest point to which they can travel along the inclined shafts 29. They are forced to this position when the brackets are turned to the position illustrated in FIG. 5 by the forces imposed on the rollers by the moving belt 14. In this position, the belt 14 is held in a raised position where, as illustrated in FIG. 3, it is in driving contact with the conveyor rollers 13 above.

By pivoting the two brackets simultaneously and the same amount to a position in which the shafts 29 converge in the direction of movement of the belt as indicated by the arrow A, the rollers are caused to travel axially inwardly to the position illustrated in FIGS. 4 and 6. Once again the inward movement of the rollers results from the forces imposed on the rollers by the movement of the belt in the direction of the arrow A as illustrated in FIG. 6. Since the brackets 24 and 24a pivot about vertical axes, the shafts 29, extending from the inclined legs, project downwardly in an inward direction in both positions. Thus, as the rollers move inwardly, they travel downwardly along the shafts 29, resulting in lowering the belt 14 as is indicated in FIG. 4.

The standards are arranged in groups, each group controlling one zone along the conveyor. The groups are arranged in tandem, each having a plurality of standards, the number being dependent upon the length of the individual zone considered to be more effective for the type and size of articles to be conveyed. This type of arrangement is conventional.

The rotational position of the brackets 24 and 24a is controlled through the levers 26. In the construction illustrated, the several standards 20 of a group are interconnected by a common actuator bar 40 (FIG. 2). At one end, the actuator bar is connected to a pivotally mounted bracket 41 which, in turn at its upper end, supports one of the sensor rollers 15. At each of the standards 20 forming a group, the actuator bar has an upstanding pin 42 which extends through elongated slots 43 and 43a in the levers 26. Thus, as the actuator bar is shifted lengthwise, the levers 26 rotate the pins 25 and, thus, the brackets 24 and 24a. In a typical accumulator, when the sensor 15 is released, i.e. with nothing resting on it, suitable means such as a spring 44 (FIG. 2) biases the sensor into raised position and holds the actuator bar 40 in a position such that the brackets are pivoted to the belt raised position illustrated in FIGS. 3 and 5. When an article depresses the sensor, the result is a shift of the actuator bar resulting in the brackets being pivoted to the position illustrated in FIGS. 4 and 6. This will result in lowering of the belt 14 and release of the drive connection between that portion of the belt supported by the standards of group or zone. It will be noted from FIG. 2 that the lowering of the belt occurs in a zone which is upstream of the article resting on the sensor. The arrangement of the sensor and the fact that it is connected to belt supporting standards located upstream from the sensor is conventional in the accumulator art. Various means of sensing the presence of an article and of interconnecting it to the belt supporting members or standards are known and many of these can be substituted for the particular structure illustrated without affecting the principles of this invention.

Figure 8:
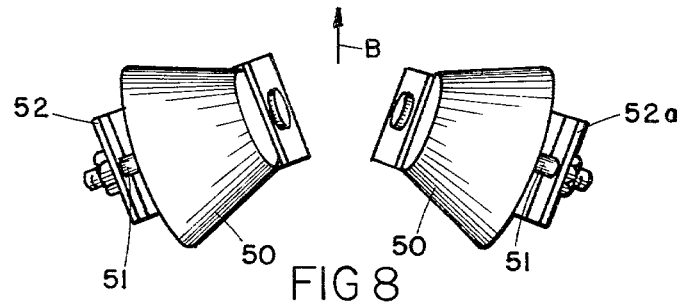
FIGS. 8 and 9 are schematic views illustrating the principles of the invention.
Figure 9:
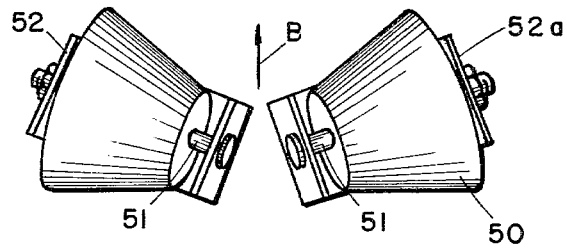
Figure 10:
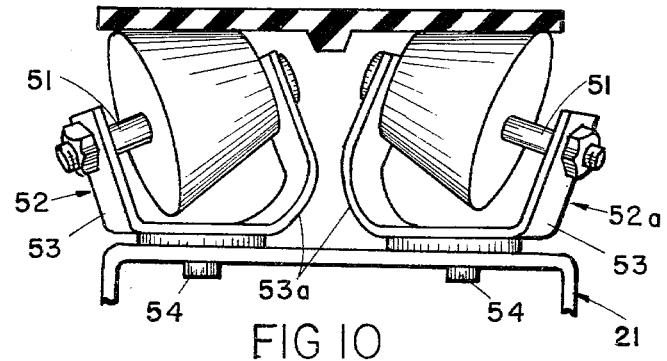
FIG. 10 is a sectional, elevational view similar to FIG. 3 illustrating a modified construction for the invention.

FIGS. 8, 9 and 10 illustrate the fact that the invention can be practiced with conical rollers 50 turned end-for-end. In this case, the end of larger diameter faces outwardly rather than inwardly. To mount the rollers in this position, the supporting shafts 51 are inclined upwardly and inwardly. To so support the shafts 51, the mounting brackets 52 and 52a have upwardly and outwardly inclined legs 53 and 53a. The inner leg 53a is longer than the outer leg 53. It will be recognized that the brackets 52 and 52a, instead of having two legs, could be designed with a single upstanding leg which could be either the inner or the outer one. Like the brackets 24 and 24a, the brackets are rotatably mounted on vertical pins 54 which are pivotally supported on the base member 21.

It will be observed from FIGS. 8 and 9 that the end-for-end reversal of the rollers 50 results in the belt 14 being in raised position when shafts 51 are convergent in the direction of movement of the belt (arrow B) and lowered when rollers are convergent in the opposite direction. This results from the change in the direction of inclination of the belt.

It will be recognized that because of the principle of operation, if suitable sensing and control means are provided so that the position of the brackets can be controlled from either direction, this invention permits the belt supports to be utilized as vertical position controls, irrespective of the direction of movement of the belt. In other words, the direction of movement of the articles along the conveyor can be reversed because, by reversing the direction of movement of the belt, the reaction of the rollers will be reversed. Thus, without shifting the pivotal position of the brackets, the axial position of the rollers will shift if the direction of movement of the belt is reversed. As a result, without changing the position of the brackets, reversal of the belt will also reverse the position of the belt vertically.

It will be understood that the invention can be used with belts of a wide variety of designs and materials. In a similar manner, the rollers 30 and 50 can be made of a wide variety of materials, although, preferably, they are molded from a suitable plastic such as nylon or Delrin. Plastic rollers have the advantage of having a lubricious or semi-lubricious surface and operate successfully with little or no noise. It will be observed from the drawings that the length of the roller 30 or 50 can vary widely, depending upon the application and the amount of supporting contact for the belt required for proper operation.

Having described a preferred embodiment and variations thereof, it will be recognized that other modifications of this invention can be made without departing from the principles thereof. Such modifications are to be considered as included in the hereinafter appended claims unless these claims, by their language, expressly state otherwise.

The embodiments of the invention in which an exclusive property or privilege is claimed are defined as follows:

1. Support means for the flat drive belt of a conveyor for moving articles along the conveyor, said support means having a pair of rollers contacting the lower surface of said belt, said rollers being laterally spaced and rotatably independent of each other, said support means characterized in that said rollers are each mounted on a separate shaft, each of said rollers being tapered and having a belt contacting surface of greater diameter at one end than at the other, means mounting said shafts to be inclined in a horizontal plane in opposite directions to each other and vertically inclined to the plane of the surface of said belt, the angle of vertical inclination being substantially equal to the taper of said rollers, said shafts being longer than said rollers and said rollers being axially movable along said shafts while the belt contacting surfaces of said rollers remain in a common horizontal plane parallel to the plane of the bottom surface of said belt.

2. The support means described in claim 1 further characterized in that means are provided mounting said shafts for pivotal movement in said horizontal plane, said rollers being movable axially of said shafts in response to a change in the direction of horizontal inclination of the shafts with respect to the centerline of the belt.

3. The support means described in claim 1 further characterized in that a bracket is provided for each of said shafts, said brackets each having an upstanding arm said shaft being mounted to said arm adjacent its upper end.

4. The support means described in claim 3 wherein each of said brackets has a pair of upstanding arms, said arms being spaced apart a distance greater than the length of said rollers whereby said rollers can shift axially of said shafts between said arms.

5. The support means described in claim 3 wherein a frame member is provided, a pivot element rotatably supporting each of said brackets on said frame about a downwardly extending axis substantially midway between the ends of said shaft.

6. The support means described in claim 5 wherein each of said brackets is pivotable to a position wherein it is at a minor angle to and alternately on opposite sides of a plane normal to the centerline of said belt.

7. The support means described in claim 6 wherein an actuator element is secured to each of said pivot elements for rotating said pivot elements.

8. The support means described in claim 7 wherein said actuator elements are levers which converge intermediate said pivot elements, said levers having elongated slots at their convergent ends, an actuator rod having a pin extending through said slots for pivoting said levers and pivot elements.

9. The support means described in claim 7 wherein said frame member has a flat top surface parallel to the plane of said belt; each of said brackets having a base portion parallel to said top surface and an arm portion inclined thereto and normal to the axis of the shaft mounted thereto.

10. In an accumulator conveyor having a flat belt serving as a driven propelling member, a plurality of support means for said belt for shifting said belt vertically between transport and accumulation positions, each of said support means having a pair of rollers contacting the lower surface of said belt, said rollers being laterally spaced and rotatably independent of each other, said support means characterized in that each of said support means has a pair of brackets spaced laterally with respect to said belt, each of said brackets having a shaft extending inwardly and inclined with respect to the transverse plane of said belt; a tapered roller on each of said shafts, the surfaces of said rollers contacting said belt being substantially horizontal; said shafts being longer than said rollers and said rollers being axially movable therealong; means pivotally mounting each of said brackets for rotation about an upwardly extending axis whereby said shafts can be shifted between a position in which they converge upstream of the conveyor with respect to the direction of movement of said belt to a position in which they converge downstream thereof for causing said rollers to travel axially of said shafts to shift the vertical position of said belt.

11. The support means described in claim 10 further characterized in that the brackets of each pair are aligned on opposite sides of the centerline of said belt and actuator means is provided for simultaneously and oppositely pivoting the brackets of each pair.

12. An accumulation conveyor as described in claim 10 further characterized in that said shafts are inclined outwardly away from the centerline of said belt and the ends of said rollers of least diameter are adjacent said belt centerline.

13. An accumulation conveyor as described in claim 10 further characterized in that said shafts are inclined inwardly toward the centerline of said belt and the ends of said rollers of greatest diameter are adjacent said belt centerline.

14. An accumulator conveyor as described in either claim 12 or 13 further characterized in that means are provided for rotating said brackets about their upwardly extending axes.

15. An accumulator conveyor as described in either claim 12 or 13 further characterized in that a pair of links are provided, one attached to each of said pivotal mounting means; an actuator element connected to both of said links for simultaneously rotating said links in opposite directions.

16. The support means described in either claim 3 or 4 wherein said conveyor is provided with a plurality of rotatable article supporting elements forming a conveying surface, said support means, when said rollers are in one position on said shafts, holding said belt in driving contact with said elements and releasing said contact when they are in the other position.

17. An accumulator conveyor as described in either claim 12 or 13 wherein said conveyor is provided with a plurality of rotatable article supporting elements forming a conveying surface, said support means, when the rollers thereon are at the ends of said shafts closest to said belt, supporting said belt in driving contact with said elements and releasing said contact when they are at the opposite ends of said shafts.

* * * * *